US012793256B2

(12) United States Patent
Ashida

(10) Patent No.: US 12,793,256 B2
(45) Date of Patent: Nov. 10, 2026

(54) IMAGE RECOGNITION APPARATUS AND EQUIPMENT

(71) Applicant: CANON KABUSHIKI KAISHA, Tokyo (JP)

(72) Inventor: Jumpei Ashida, Cupertino, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 18/660,994

(22) Filed: May 10, 2024

(65) Prior Publication Data

US 2024/0386596 A1 Nov. 21, 2024

(30) Foreign Application Priority Data

May 18, 2023 (JP) ................................ 2023-082541

(51) Int. Cl.

| | |
|---|---|
| ***G06V 20/40*** | (2022.01) |
| ***G06T 7/70*** | (2017.01) |
| ***G06V 10/60*** | (2022.01) |
| ***G06V 10/82*** | (2022.01) |

(52) U.S. Cl.

CPC ................ *G06T 7/70* (2017.01); *G06V 10/60* (2022.01); *G06V 10/82* (2022.01); *G06V 20/44* (2022.01); *G06V 2201/07* (2022.01)

(58) Field of Classification Search

CPC .......... G06T 7/70; G06V 10/60; G06V 10/82; G06V 20/44; G06V 2201/07

See application file for complete search history.

(56) References Cited

U.S. PATENT DOCUMENTS

2022/0180619 A1* 6/2022 Pan ........................ G06V 10/62
2023/0154135 A1 5/2023 Nakagawa
2023/0319437 A1 10/2023 Miyabe

FOREIGN PATENT DOCUMENTS

JP 2019110604 A 7/2019
JP 2022073228 A 5/2022
JP 2023076773 A 6/2023

OTHER PUBLICATIONS

Sabater, Alberto, Luis Montesano, and Ana C. Murillo. "Event transformer. a sparse-aware solution for efficient event data processing." In Proceedings of the IEEE/CVF Conference on Computer Vision and Pattern Recognition, pp. 2677-2686. 2022. ( Year: 2022).*

(Continued)

*Primary Examiner* — Carol W Chan
(74) *Attorney, Agent, or Firm* — Canon U.S.A., Inc. IP Division

(57) ABSTRACT

An image recognition apparatus includes an event data obtaining member, a metadata obtaining member, and a processing member. The event data obtaining member is configured to obtain event data that indicates changes in light amounts of pixels of a sensor. The metadata obtaining member is configured to obtain metadata related to a position of a target object. The processing member is configured to perform, using the event data, processing for recognizing the target object using an algorithm that is based on a spiking neural network. The processing member controls a period for referring to the event data in the recognition processing, based on the obtained metadata.

6 Claims, 8 Drawing Sheets

(56) References Cited

OTHER PUBLICATIONS

Wan, Jixiang, Ming Xia, Zunkai Huang, Li Tian, Xiaoying Zheng, Victor Chang, Yongxin Zhu, and Hui Wang. "Event-based pedestrian detection using dynamic vision sensors." Electronics 10, No. 8 (2021): 888. (Year: 2021).*

Colonnier, Fabien, Aravind Seeralan, and Longwei Zhu. "Event-based visual sensing for human motion detection and classification at various distances." In Pacific-Rim Symposium on Image and Video Technology, pp. 75-88. Cham: Springer International Publishing, 2022. (Year: 2022).*

Rebecq, Henri, Timo Horstschäfer, Guillermo Gallego, and Davide Scaramuzza. "Evo: A geometric approach to event-based 6-dof parallel tracking and mapping in real time." IEEE Robotics and Automation Letters 2, No. 2 (2016): 593-600. (Year: 2016).*

Thomas Finateu, et. al.; "A 1280×720 Back-Illuminated Stacked Temporal Contrast Event-Based Vision Sensor with 4.86um Pixels, 1.066GEPS Readout, Programmable Event-Rate Controller and Compressive Data-Formatting Pipeline;" ISSCC 2020 / Session 5 / Imagers and ToF Sensions / 5.10; pp. 1-3.

Daniel Gehrig et. al.; "End-to-End Learning of Representations for Asynchronous Event-Based Data;" IEEE International Conference on Computer Vision (ICCV); Seoul, 2019; pp. 1-16.

* cited by examiner

IMAGE RECOGNITION APPARATUS AND EQUIPMENT

BACKGROUND

Technical Field

A technique according to the present disclosure relates to an image recognition apparatus and an equipment.

Description of the Related Art

With the widespread use of IoT, AI, automated driving, and the like in recent years, there is demand for lower-power and high-speed image sensors. Finateu et al. "A 1280×720 Back-Illuminated Stacked Temporal Contrast Event-Based Vision Sensor with 4.86 μm Pixels, 1.066GEPS Readout, Programmable Event-Rate Controller and Compressive Data-Formatting Pipeline" 2020 IEEE International Solid-State Circuits Conference illustrates an event-based sensor that monitors changes in light amounts using pixels arranged in a two-dimensional array, and outputs a signal when a change is detected. As illustrated in Finateu et al. "A 1280×720 Back-Illuminated Stacked Temporal Contrast Event-Based Vision Sensor with 4.86 μm Pixels, 1.066GEPS Readout, Programmable Event-Rate Controller and Compressive Data-Formatting Pipeline" 2020 IEEE International Solid-State Circuits Conference, the event-based sensor outputs a signal only when a change in a light amount occurs, and thus can perform low-power and high-speed operations. In addition, Gehrig et al. "End-to-End Learning of Representations for Asynchronous Event-Based Data" ICCV 2019 IEEE International Solid-State Circuits Conference discloses a technique for performing image recognition processing by inputting an output signal of an event-based sensor to a neural network.

With the techniques disclosed in Finateu et al. "A 1280×720 Back-Illuminated Stacked Temporal Contrast Event-Based Vision Sensor with 4.86 μm Pixels, 1.066GEPS Readout, Programmable Event-Rate Controller and Compressive Data-Formatting Pipeline" 2020 IEEE International Solid-State Circuits Conference and Gehrig et al. "End-to-End Learning of Representations for Asynchronous Event-Based Data" ICCV 2019 IEEE International Solid-State Circuits Conference, input data (a tensor) to be input to a neural network is formed by performing predetermined processing on data obtained by an event-based sensor (hereinafter, event data), and then performing sampling at a predetermined time interval. In this case, a range in a time direction of the event data that affects the tensor is uniform in any region in an image.

However, for example, the amount of event data that is generated differs according to a distance to a subject that is a recognition target, and thus, particularly when the distance to the subject is long or the like, information sufficient for recognition is not obtained, which may lead to a decrease in the recognition accuracy.

SUMMARY

A technique according to the present disclosure has been invented in light of the aforementioned issue. One embodiment of the present disclosure provides a technique for accurately performing recognition processing when recognition processing is performed using event data.

According to one embodiment, an image recognition apparatus includes an event data obtaining member, a metadata obtaining member, and a processing member. The event data obtaining member is configured to obtain event data that indicates changes in light amounts of pixels of a sensor. The metadata obtaining member is configured to obtain metadata related to a position of a target object. The processing member is configured to perform, using the event data, processing for recognizing the target object using an algorithm that is based on a spiking neural network. The processing member controls a period for referring to the event data in the recognition processing, based on the obtained metadata. In addition, according to another embodiment, an image recognition apparatus includes an event data obtaining member, a metadata obtaining member, and a processing member. The event data obtaining member is configured to obtain event data that indicates changes in light amounts of pixels of a sensor. The metadata obtaining member is configured to obtain metadata related to a position of a recognition target object. The processing member is configured to perform, using the event data, processing for recognizing the target object using an algorithm that is based on a learning model that accepts data of a fixed size as input. The processing member adjusts a size of the event data in the recognition processing in accordance with the obtained metadata so as to obtain input of the algorithm. Further, according to yet another embodiment, an image recognition apparatus includes an event data obtaining member, a metadata obtaining member, and a processing member. The event data obtaining member is configured to obtain event data that indicates changes in light amounts of pixels. The metadata obtaining member is configured to obtain metadata related to a position of a recognition target object. The processing member is configured to perform processing for recognizing the recognition target object, using the event data. The metadata includes data indicating a result of measuring a distance to the recognition target object, and the longer the distance to the target object is, the longer a period for referring to the event data in the recognition processing is made by the processing member based on the result of measuring the distance.

Moreover, according to some embodiments, an equipment that includes the image recognition apparatus as described above, further includes at least one of: an optical device that supports the image recognition apparatus; a control device that controls the image recognition apparatus; a processing device that processes a signal output from the image recognition apparatus; a display device that displays information obtained by the image recognition apparatus; a storage device that stores information obtained by the image recognition apparatus; and a machine device that operates based on information obtained by the image recognition apparatus.

Further features of the disclosure will become apparent from the following description of exemplary embodiments with reference to the attached drawings.

DESCRIPTION OF THE EMBODIMENTS

Figure 1:
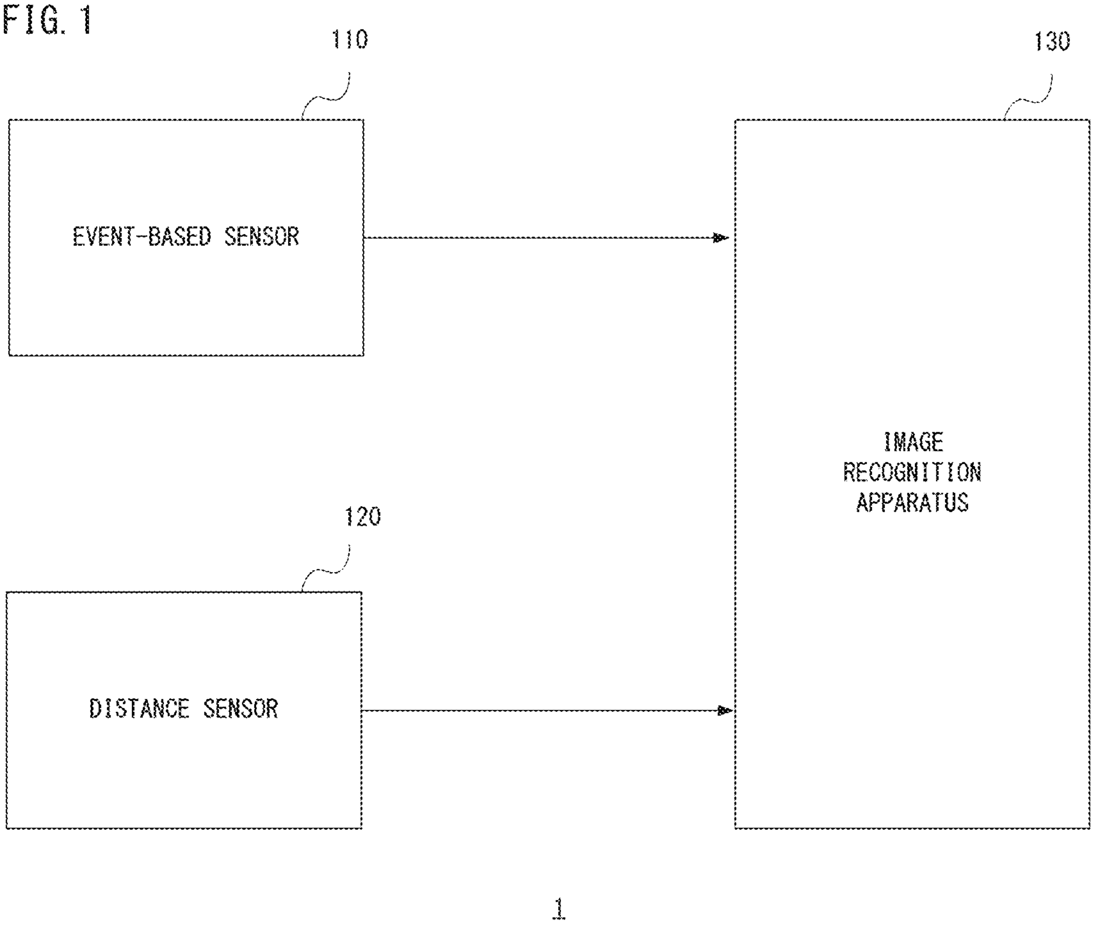
FIG. 1 is a diagram showing a configuration example of a recognition system according to a first embodiment.

Embodiments of the disclosure will be described below in detail with reference to the drawings. Note that, in the following description, terms expressing specific directions and positions (for example, "up", "down", "right", "left", and other terms that include these terms) are used as necessary. Those terms are used for ease of understanding of the embodiments described with reference to the drawings, and the technical scope of the disclosure is not intended to be limited by the meanings of the terms. In addition, those terms are used in order to embody technique ideas of the disclosure, not to limit the disclosure. A constituent element of one embodiment can be added to another embodiment, or replace a constituent element of another embodiment. In addition, the sizes of and positional relations between members shown in the drawings may be exaggerated in order to clarify description.

First Embodiment

A configuration of a recognition system that includes an image recognition apparatus according to a first embodiment will be described with reference to FIG. 1. As shown in FIG. 1, a recognition system 1 includes an event-based sensor 110 (sensor), a distance sensor 120, and an image recognition apparatus 130. The image recognition apparatus 130 obtains, from the event-based sensor 110, event data indicating changes in the light amounts of the pixels that make up the event-based sensor 110. In addition, the image recognition apparatus 130 obtains distance data, namely metadata related to the position of a recognition target object, from the distance sensor 120. In addition, the image recognition apparatus 130 controls a period for referring to event data in recognition processing in accordance with obtained metadata, and performs processing for recognizing a target object (for example, recognizing the position of a pedestrian) using the event data.

Figure 2:
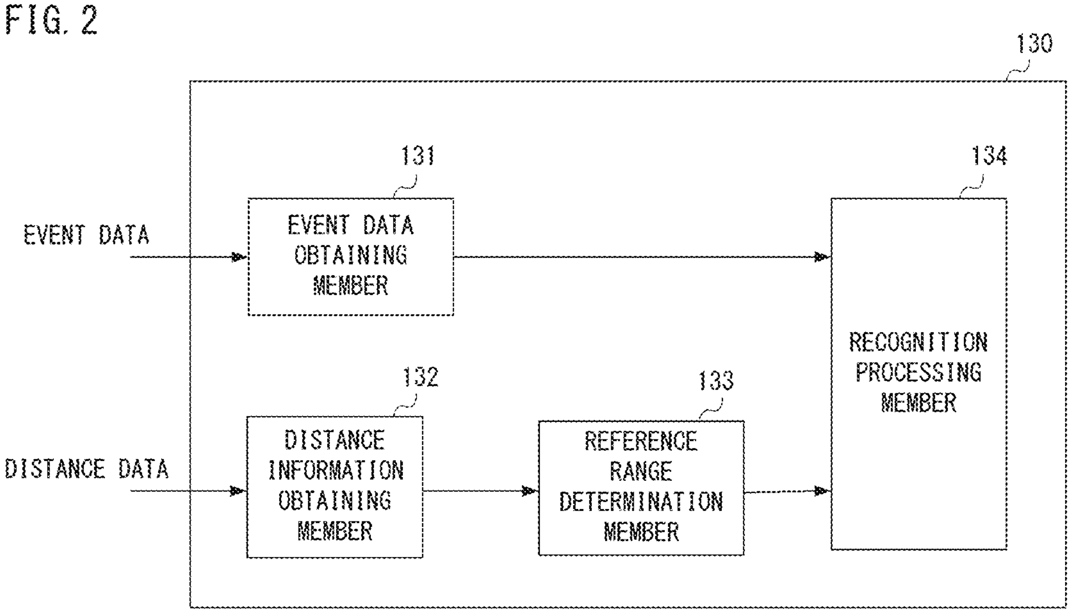
FIG. 2 is a diagram showing a configuration example of an image recognition apparatus according to the first embodiment.

(Description of Image Recognition Apparatus) Next, a configuration of the image recognition apparatus 130 according to the first embodiment will be described with reference to FIG. 2. As shown in FIG. 2, the image recognition apparatus 130 includes an event data obtaining member 131, a distance information obtaining member 132, a reference range determination member 133, and a recognition processing member 134. The term "member" may refer to a device, a circuit, a functionality, a software module, a hardware circuit, a software program, or a combination of a hardware circuit and a software program that performs a specified operation. The operation may be any operation related to the function of the member. Examples of these operations are obtaining event data, obtaining distance information, determining reference range, etc. The operation may be performed by a programmable processor that executes a program or instructions stored in a memory. The event data obtaining member 131 is connected to the event-based sensor 110, and obtains event data from the event-based sensor 110. Event data is composed of four pieces of data expressed by (x, y, t, p). Here, of the four pieces of data that make up event data, x and y indicate the coordinates of a pixel of the event-based sensor 110, t indicates a time when an event was detected, and p indicates the polarity of an event (an increase or a decrease in a light amount). The event data obtaining member 131 has a storage member (not illustrated) therein, and can hold obtained event data in the storage member.

The distance information obtaining member 132 is connected to the distance sensor 120 that can measure a distance, such as a Lidar sensor or a Radar sensor, and obtains, from the distance sensor 120, distance (depth) data that is data indicating a result of measuring a distance to a recognition target object. Commonly, distance data and other additional information are also called metadata. The term "metadata" as used here refers to a set of data that describes and gives information about other data. For example, the distance data refers to a set of data that describes about the distance or position of a target object. The distance information obtaining member 132 converts obtained distance data into a depth map in the form of a two-dimensional image in accordance with the coordinate system indicated by event data. Note that the distance information obtaining member 132 may output distance data obtained from the distance sensor 120, to the later-stage reference range determination member 133 without converting the distance data into a depth map. The distance information obtaining member 132 is an example of a metadata obtaining member that obtains metadata related to the position of a recognition target object.

The reference range determination member 133 determines a range in the time direction of event data (reference period) for each pixel (or each region) in accordance with a depth map output from the distance information obtaining member 132. Here, the longer the distance from the distance sensor 120 is, the more the reference range determination member 133 increases the reference range in the time direction based on data output from the distance information obtaining member 132, and the shorter the distance from the distance sensor 120 is, the more the reference range determination member 133 decreases the reference range in the time direction.

Here, the reason why the reference range determination member 133 controls the reference range in this manner will be described. The farther the position of a subject is from the distance sensor 120, the lower the apparent speed of the subject that is a target object (the speed on a two-dimensional plane on an image) becomes, and the smaller the changes in the light amounts of the pixels of the event-based sensor 110 also become. That is to say, the occurrence frequency of events that indicates changes in the light amounts in the event-based sensor 110 decreases, and thus the number of events in the event-based sensor 110 per unit time and/or per unit region (hereinafter, referred to as "event frequency/density") decreases. On the other hand, the closer the position of a subject to the distance sensor 120 is, the higher the apparent speed of the subject becomes, and the larger the changes in the light amounts of the pixels of the event-based sensor 110 also become. That is to say, the event frequency/density in the event-based sensor 110 increases. Therefore, there is a negative correlation between the distance to the subject and the event frequency/density.

Commonly, when processing for recognizing a target object using event data is performed, and the number of events that is used for recognition processing is small, an amount of information sufficient for recognition processing is not obtained, which may lead to a decrease in the recognition accuracy. For this reason, when the event frequency/density is low, it is possible to increase the number of events that are used for recognition processing by the reference range determination member 133 increasing the reference range in the time direction. The reference range (window width) that is determined by the reference range determination member 133 is denoted by W (x, y). At this time, letting a time serving as a reference as T, the reference range determination member 133 controls the recognition processing member 134 to refer to events at the coordinates (x, y) of pixels for which an occurrence time t satisfies Equation (1) below.

$$T - W(x, y) \leq t \leq T \tag{1}$$

The recognition processing member 134 obtains, from the event data obtaining member 131, event data of events that have occurred within a reference range, in accordance with reference range information (window width information) determined by the reference range determination member 133, and performs recognition processing using the obtained event data. Note that the reference range determination member 133 and the recognition processing member 134 are each an example of a processing member that controls a period for referring to event data in recognition processing, in accordance with obtained metadata, and performs processing for recognizing a target object using the event data.

Figure 3:
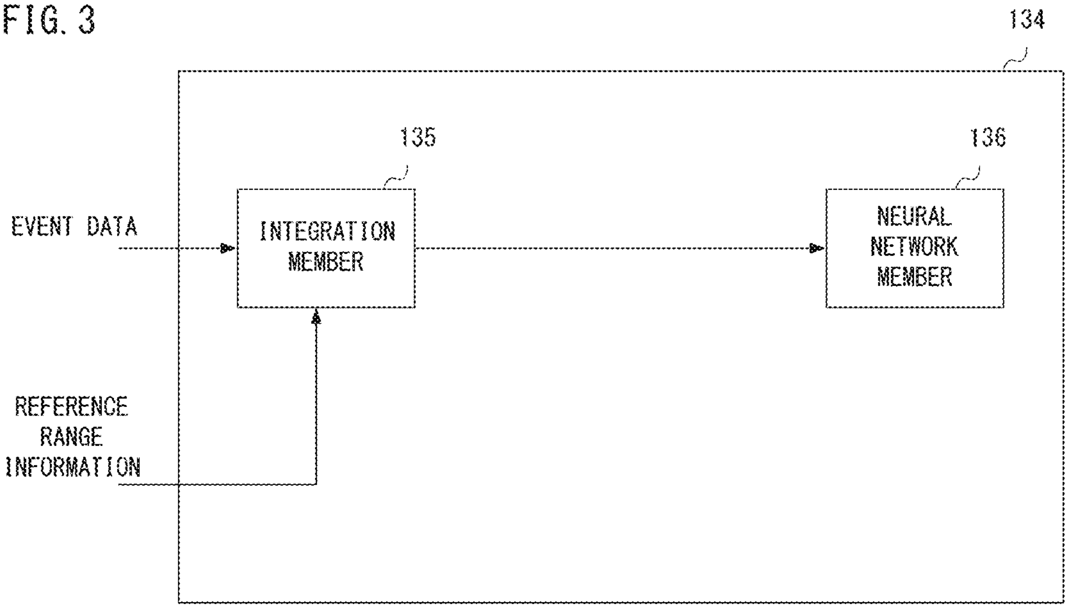
FIG. 3 is a diagram showing a configuration example of a recognition processing member according to the first embodiment.

Recognition processing that is executed by the recognition processing member 134 will be described in detail with reference to FIG. 3. As shown in FIG. 3, the recognition processing member 134 includes an integration member 135 and a neural network member 136. The neural network member 136 uses a CNN (Convolutional Neural Network) as a learning model that accepts event data. The neural network member 136 then performs processing for recognizing a target object based on an object recognizing algorithm that is based on the CNN, and outputs a detection result. Note that input data that is input to the CNN is usually a tensor (multidimensional data) of a fixed size, and thus event data whose length in the time direction differs for each pixel cannot be input to the CNN. In view of this, as preprocessing for inputting event data to the neural network member 136, the integration member 135 performs integration processing in the time direction on event data using reference range information. Example of integration processing include calculation of the number of events in a reference range determined based on Equation (1), calculation of an occurrence frequency of events in the reference range, calculation of logical sum in the reference range in the time direction (that is to say, generation of information indicating whether or not at least one event has occurred), and the like. Accordingly, the integration member 135 generates data of a fixed size by adjusting the size of event data in the time direction so as to obtain input of the algorithm, in accordance with obtained metadata.

Therefore, the image recognition apparatus 130 according to the present embodiment can maintain the accuracy of recognition processing even when the distance between a device (distance sensor) and a target object is long, by controlling a period for referring to event data in accordance with the distance between the apparatus and the recognition target object. In addition, when the distance to the target object is short, a period for referring to event data is short, and thus the image recognition apparatus 130 can realize low-latency recognition processing. Particularly, it is possible to realize obstacle detection when the image recognition apparatus 130 is applied to an autonomic mobile object such as a drone, and avoidance of collision in automated driving when the image recognition apparatus 130 is applied to a vehicle. In this manner, with the image recognition apparatus 130 according to the present embodiment, it is possible to realize low-latency recognition processing, which is important when a distance to a target object is short.

Note that, in the above description, distance data, which is metadata obtained from the distance sensor 120, is used for calculation of a reference range of event data, but distance data can also be input to the neural network member 320 to further increase the accuracy of recognition processing. Data can be input to the neural network through a plurality of channels, and for example, when an RGB image is input, the data can be input through three channels that respectively correspond to R, G, and B. In view of this, when distance data is used as input to the neural network, for example, event data is input through a first channel, and distance data is input through a second channel. Accordingly, the neural network member 320 can perform more accurate recognition processing by using distance data to recognize a target object in addition to event data.

Second Embodiment

Next, an image recognition apparatus according to a second embodiment will be described. Note that, in the following description, configurations similar to those of the first embodiment are given the same reference numerals, and a detailed description thereof is omitted.

Figure 4:
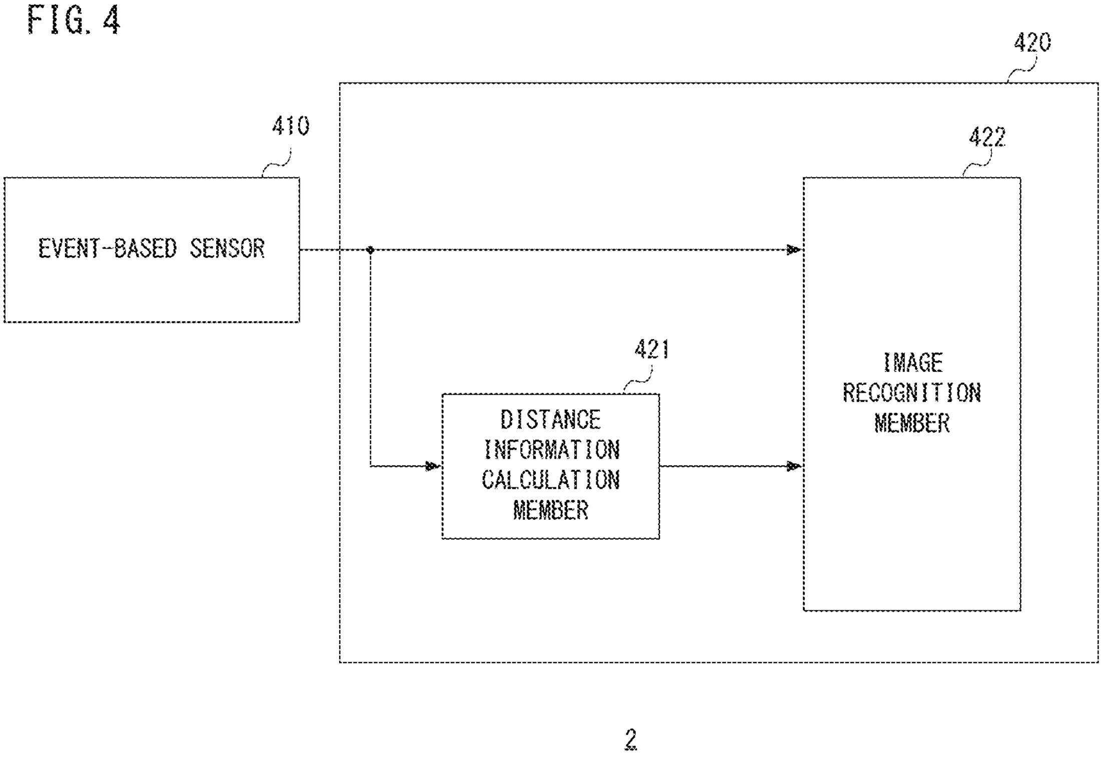
FIG. 4 is a diagram showing a configuration example of a recognition system according to a second embodiment.

FIG. 4 shows a configuration of a recognition system 2 according to the second embodiment. As shown in FIG. 4, the recognition system 2 includes an event-based sensor 410 and an image recognition apparatus 420. In addition, the image recognition apparatus 420 includes a distance information calculation member 421 and an image recognition member 422. In the first embodiment, the image recognition apparatus 130 obtains event data and metadata (distance data) from different sensors, but, in the present embodiment, the image recognition apparatus 420 obtains event data and distance data from the event-based sensor 410.

The pixels that make up the event-based sensor 410 have a so-called dual pixel configuration in which each pixel includes a unit composed of one microlens and two photodiodes (image capture elements), for example, and each of the photodiodes detects an event. Event data obtained from one photodiode of a pixel is defined as an A image, and event data obtained from the other photodiode is defined as a B image. At this time, the distance information calculation member 421 of the image recognition apparatus 420 calculates the amount of difference between an A image and a B image obtained from each pixel, with respect to a predetermined region of the event-based sensor 410, as a difference in information regarding a recognition target object. Accordingly, the distance information calculation member 421 can estimate the distance between the event-based sensor 410 and the recognition target object. The distance information calculation member 421 outputs the estimated distance to the target object as an estimation result, namely distance data, to the image recognition member 422. In addition, the image recognition member 422 of the image recognition apparatus 420 can obtain, as event data, data obtained by adding an A image and a B image obtained from each pixel of the event-based sensor 410. The distance information calculation member 421 is an example of an estimation member that estimates a distance to a target object based on differences in information regarding the target object obtained from a plurality of image capture elements.

The image recognition member 422 generates event data using data obtained from the event-based sensor 410, and executes processing for recognizing a target object using the generated event data and distance data obtained from the distance information calculation member 421, in a similar manner to the first embodiment. Note that, unlike the image recognition apparatus 130 according to the first embodiment, with the image recognition apparatus 420 in the present embodiment, distance data and event data are obtained from the same pixels of the event-based sensor 410, that is to say, pixels for which the optical axis of the microlens is the same. For this reason, in the present embodiment, processing for converting a coordinate system that is performed on distance data and event data, such as that performed in the first embodiment is unnecessary.

Note that, as a modified example of the present embodiment, all or some of the event-based sensor 410, the distance information calculation member 421, and the image recognition member 422 may be mounted in one sensor. When the event-based sensor 410, the distance information calculation member 421, and the image recognition member 422 are mounted in one sensor, a series of processing from obtaining event data and metadata to recognizing a target object can be completed in the sensor. Accordingly, it is possible to realize a sensor that outputs only a result of recognizing a recognition target object.

Furthermore, as another modified example of the present embodiment, the event-based sensor 410 may have a so-called hybrid configuration in which both frame data (an image captured by an image sensor) and event data can be captured. In this case, the distance information calculation member 421 can calculate distance data using A images and B images of frame data obtained from the event-based sensor 410. In addition, as processing for calculating distance data, for example, a technique for estimating three-dimensional information regarding the surroundings of the apparatus from an image of Visual SLAM (Simultaneous Localization and Mapping) or the like may also be used. Accordingly, the distance information calculation member 421 can perform calculation based on event data or frame data, and can calculate a distance based on an event frequency/density.

Third Embodiment

Next, an image recognition apparatus according to a third embodiment will be described. Note that, in the following description, configurations similar to those of any of the above embodiments are given the same reference numerals, and a detailed description thereof is omitted.

Figure 5:
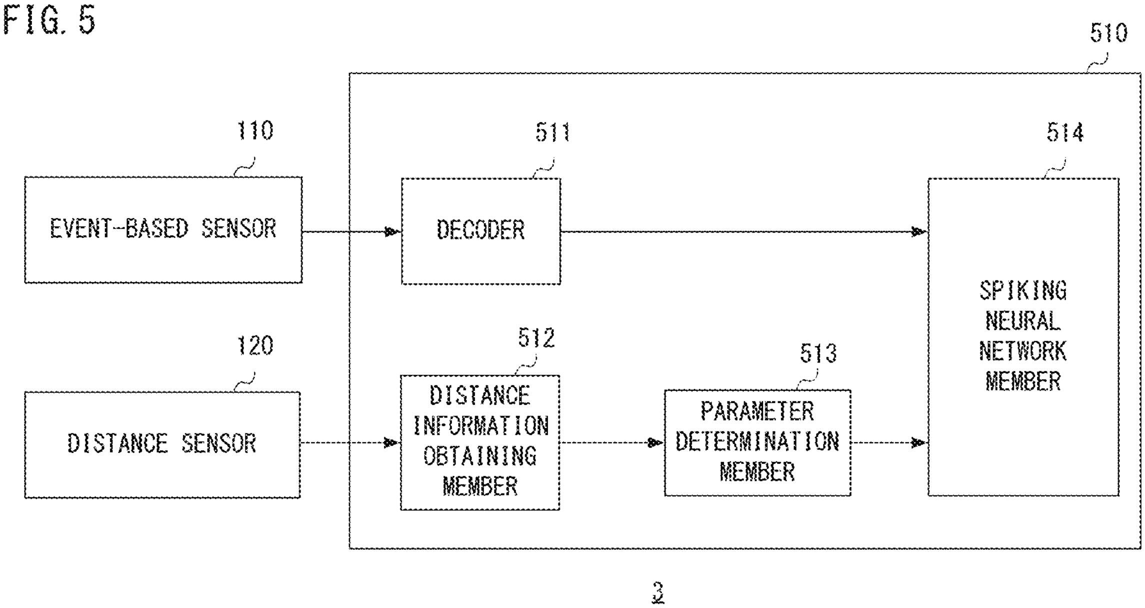
FIG. 5 is a diagram showing a configuration example of a recognition system according to a third embodiment.

FIG. 5 shows a configuration example of a recognition system 3 according to the present embodiment. As shown in FIG. 5, the recognition system 3 includes the event-based sensor 110, the distance sensor 120, and an image recognition apparatus 510. In addition, the image recognition apparatus 510 includes a decoder 511, a distance information obtaining member 512, a parameter determination member 513, and a spiking neural network member 514. In the above embodiments, the image recognition apparatus executes recognition processing using a CNN, but the image recognition apparatus 510 according to the present embodiment performs processing for recognizing a target object using an SNN (Spiking Neural Network).

The decoder 511 decodes event data that is input in an (x, y, t, p) format in a similar manner to the above embodiments, and converts the decoded data into a two-dimensional time-series pulse sequence for each pixel. Data that is obtained by the decoder 511 performing the processing is equivalent to row data before a time stamp is added by the event-based sensor 110 when the event-based sensor 110 detects an event. As a modified example of the present embodiment, when the image recognition apparatus 510 obtains row data from the event-based sensor 110, a configuration can be adopted in which the image recognition apparatus 510 does not include the decoder 511.

The distance information obtaining member 512 obtains distance data as metadata from the distance sensor 120 similarly to the first embodiment. In addition, the parameter determination member 513 determines a time constant of a spiking neural network that is used by the spiking neural network member 514, based on the distance data obtained by the distance information obtaining member 512.

An LIF (Leaky Integrate and Fire) neuron that is used for the spiking neural network according to the present embodiment calculates a membrane potential V(t) is based on Equation (2) below.

$$\tau\frac{dV(t)}{dt} = (-V(t) + V_R) + F(t) \tag{2}$$

Here, $\tau$ indicates a time constant, $V_R$ indicates a predetermined reset potential, and F(t) indicates a spike sequence that is input to the LIF neuron. That is to say, a membrane potential V(t) behaves so as to integrate the input F(t), and attenuate with a lapse of time. The speed of attenuation is controlled by the time constant $\tau$. Specifically, when the time constant $\tau$ is increased, attenuation becomes moderate, and a time during which one spike has influence becomes longer. Conversely, when the time constant $\tau$ is decreased, attenuation becomes fast, and a time during which one spike has influence becomes shorter. That is to say, in the present embodiment, it is possible to control the reference range in the time direction of event data of the spiking neural network member 514 by controlling the time constant $\tau$. In the present embodiment, the time constant $\tau$ is controlled such that, the longer the distance between the distance sensor 120 and a target object is, the lower the attenuation speed becomes, and, the shorter the distance between the distance sensor 120 and the target object is, the faster the attenuation speed becomes.

The spiking neural network member 514 executes recognition processing using data of a two-dimensional time-series pulse sequence that is output from the decoder 511, as input to the spiking neural network. In addition, the spiking neural network member 514 uses a time constant determined by the parameter determination member 513, as a time constant of the LIF neuron.

Accordingly, in processing for recognizing a target object that is performed by the spiking neural network member 514, when the distance to the target object is long, it is possible to suppress a decrease in the recognition accuracy even if the event frequency/density is low. In addition, in processing for recognizing a target object that is performed by the spiking neural network member 514, when the distance to the target object is short, it is possible to realize low-latency recognition processing, which is one advantage of an SNN.

Fourth Embodiment

Next, an image recognition apparatus according to a fourth embodiment will be described. Note that, in the following description, configurations similar to those of any of the above embodiments are given the same reference numerals, and a detailed description thereof is omitted.

Figure 6:
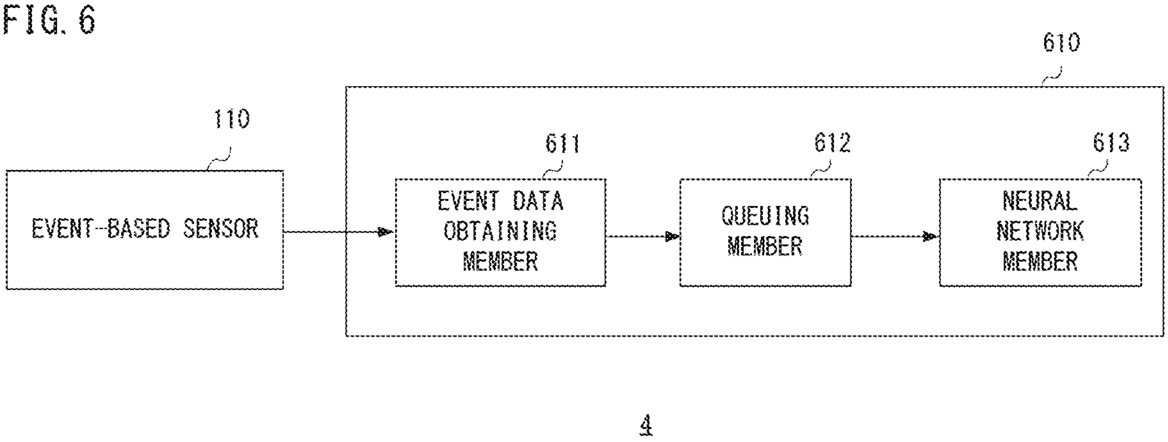
FIG. 6 is a diagram showing a configuration example of a recognition system according to a fourth embodiment.

In the above embodiments, examples have been described in which a reference range in the time direction of event data is controlled in accordance with a distance to a recognition target object, but, in the present embodiment, a reference range in the time direction is controlled in accordance with the number of events that occur in the event-based sensor 110. FIG. 6 indicates a configuration example of a recognition system 4 according to the present embodiment. As shown in FIG. 6, the recognition system 4 includes the event-based sensor 110 and an image recognition apparatus 610. In addition, the image recognition apparatus 610 includes an event data obtaining member 611, a queuing member 612, and a neural network member 613.

The event data obtaining member 611 obtains event data from the event-based sensor 110 similarly to the above embodiments.

The queuing member 612 counts the number of events for each predetermined pixel region of the event-based sensor 110, based on event data output from the event data obtaining member 611, and holds the event data in the queuing member 612 until the number of events exceeds a predetermined number. When the counted number of events exceeds the predetermined number, the queuing member 612 integrates the held event data, and outputs the integrated event data to the neural network member 613. When the event data is output to the neural network member 613, the queuing member 612 resets the counted number of events to 0, and repeatedly counts the number of events using event data that is output from the event data obtaining member 611 after the reset. Holding event data using the queuing member 612 in this manner is equivalent to controlling a reference range in the time direction of event data based on the event frequency/density. That is to say, the event frequency/density can also be regarded as a type of metadata.

The neural network member 613 executes processing for recognizing a target object using event data output from the queuing member 612, in a similar manner to those described above.

In the present embodiment, the longer a distance to a target object is, the lower the event frequency/density becomes and the longer the time during which the queuing member 612 holds event data becomes, and thus a reference range in the time direction of event data increases. On the other hand, the closer the distance to the target object is, the higher the event frequency/density becomes and the shorter the time during which the queuing member 612 holds event data becomes, and thus the reference range in the time direction of event data decreases. Therefore, the image recognition apparatus 610 according to the present embodiment can also control a period for referring to event data in accordance with the distance to the recognition target object, similarly to the first embodiment. In addition, in the present embodiment, even when the event frequency/density varies due to a factor other than a distance (for example, contrast between a target object and a background), the time during which the queuing member 612 holds event data changes, making it possible to control a period for referring to event data.

Note that, when the number of events is counted, the queuing member 612 may decrease the counted number of events by a predetermined value at a time with a lapse of time. Accordingly, even when, in the event-based sensor 110, an event that irregularly occurred due to noise is counted as one of the number of events, the number of events decreases while the queuing member 612 holds the event data. As a result, the queuing member 612 of the image recognition apparatus 610 can accumulate event data without counting an irregularly occurred event substantially as one of the number of events.

Fifth Embodiment

Next, an image recognition apparatus according to a fifth embodiment will be described. Note that, in the following description, configurations similar to those of any of the above embodiments are given the same reference numerals, and a detailed description thereof is omitted.

In the above embodiments, an example has been described in which a reference range in the time direction of event data is controlled in accordance with a distance to a recognition target object, but the image recognition apparatus according to the present embodiment generates attribute information for each region in an image capture area of the event-based sensor. Here, the attribute information is information related to priorities of a recognition accuracy and a recognition speed in recognition processing that uses event data. The image recognition apparatus according to the present embodiment then controls a reference range in the time direction of event data, for each region in the image capture area, based on generated attribute information.

Figure 7:
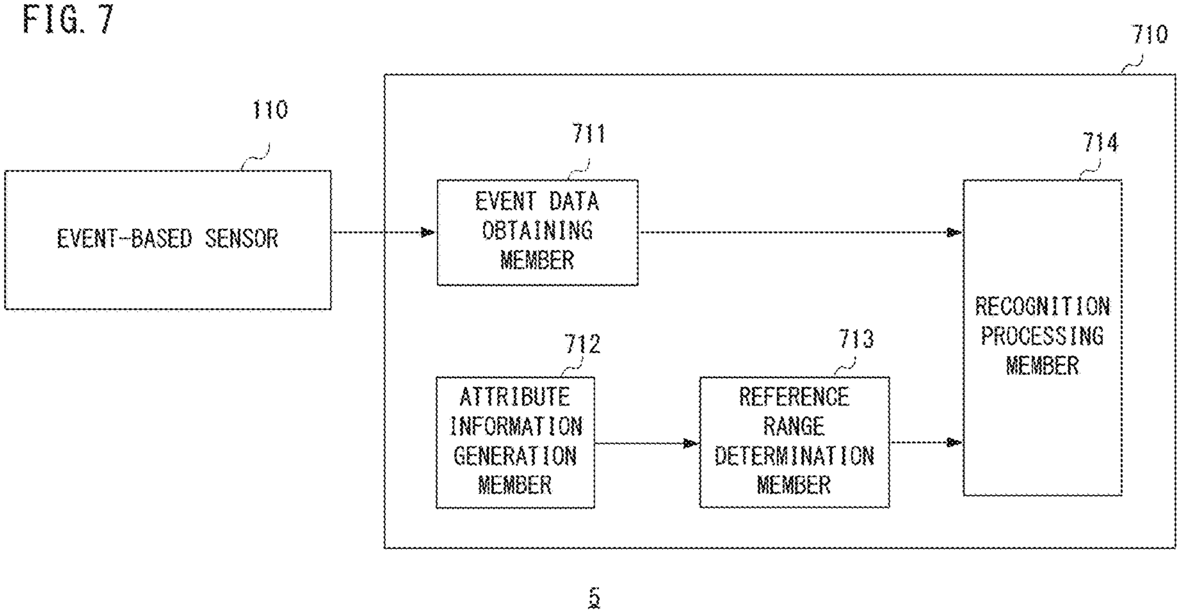
FIG. 7 is a diagram showing a configuration example of a recognition system according to a fifth embodiment.

FIG. 7 shows a configuration example of a recognition system 5 according to the present embodiment. As shown in FIG. 7, the recognition system 5 includes the event-based sensor 110 and an image recognition apparatus 710. In addition, the image recognition apparatus 710 includes an event data obtaining member 711, an attribute information generation member 712, a reference range determination member 713, and a recognition processing member 714.

The event data obtaining member 711 obtains event data from the event-based sensor 110 similarly to the first embodiment. The attribute information generation member 712 generates attribute information based on information obtained from outside the recognition system 5.

When the recognition system 5 is applied to an automobile, for example, the image recognition apparatus 710 stores position information of an intersection where there is a blind spot in which visual recognition of a driver may delay, in a storage member (not illustrated) in advance. The attribute information generation member 712 then obtains GPS information from outside, and specifies the position of the automobile based on the obtained GPS information. The attribute information generation member 712 specifies a region in the vicinity of the blind spot in an area currently captured by the event-based sensor 110, as a region in which a recognition speed is prioritized in recognition processing, based on a position indicated by the position information stored in the storage member and the specified position of the automobile. The attribute information generation member 712 then generates attribute information indicating that the recognition speed is prioritized in the region.

In addition, as another example of a case where the recognition system 5 is applied to an automobile, when the automobile is chasing a specific vehicle, the image recognition apparatus 710 stores, in the storage member, vehicle information such as the number on the license plate, the vehicle type, and the vehicle body color of the vehicle that is being chased. In addition, assume that the image recognition apparatus 710 causes the event-based sensor 110 to capture an image of the vehicle using the vehicle information. At this time, the attribute information generation member 712 specifies a region in the vicinity of the region of the vehicle indicated by a previous recognition result of the vehicle, in the area that is currently captured by the event-based sensor 110, as a region in which the recognition accuracy is prioritized in recognition processing. The attribute information generation member 712 then generates attribute information indicating that recognition accuracy is prioritized in the region. Note that attribute information for each region in the image capturing area of the event-based sensor is also called ROI (Region Of Interest) information, and can be regarded as a type of metadata.

The reference range determination member 713 then determines a reference range in the time direction of event data in the region indicated by the attribute information output from the attribute information generation member 712, in the area that is currently captured by the event-based sensor 110, based on the attribute information. Specifically, the reference range determination member 713 increases the reference range in the time direction when the attribute information indicates that the recognition accuracy is prioritized, and decreases the reference range in the time direction when the attribute information indicates that the recognition speed is prioritized. The recognition processing member 714 executes processing for recognizing a recognition target object, using event data that is output from the event data obtaining member 711, and information regarding the reference range of the event data that is output from the reference range determination member 713.

In this manner, with the image recognition apparatus 710 according to the present embodiment, it is possible to perform setting on whether the recognition accuracy or the recognition speed is prioritized in a partial region of an area that is currently captured by the event-based sensor 110. Accordingly, it is possible to realize more favorable image recognition processing in accordance with usage of the image recognition apparatus 710.

Sixth Embodiment

Figure 8:
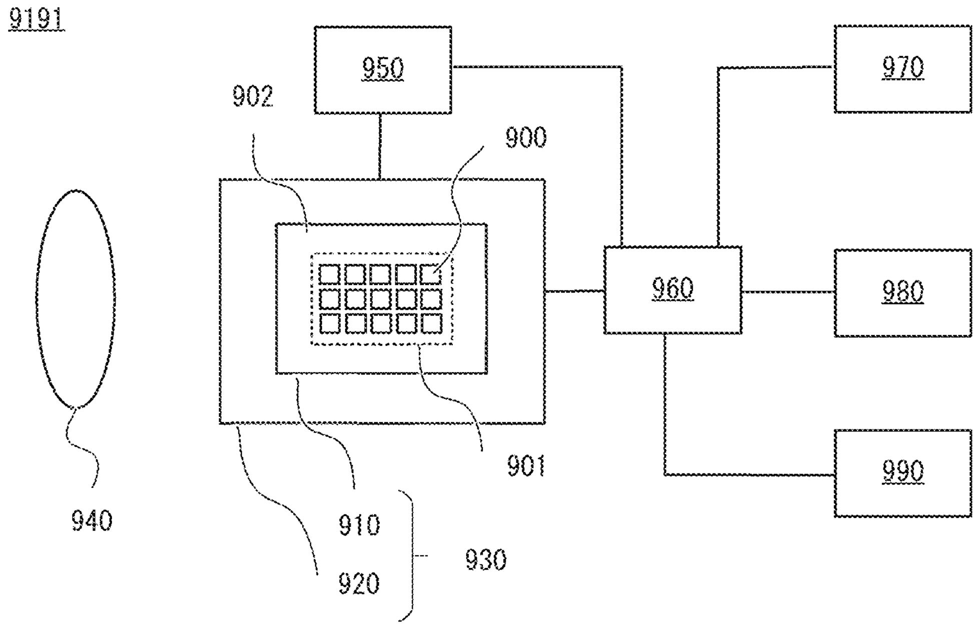
FIG. 8 is a diagram showing a configuration example of an equipment that includes a semiconductor device according to a sixth embodiment.

Any of the first to fifth embodiments described above can be applied to a sixth embodiment. FIG. 8 is a schematic view for describing equipment 9191 including a semiconductor apparatus 930 of the present embodiment. The semiconductor apparatus 930 can be any of the image recognition apparatuses described in the first to fifth embodiments, or an image recognition apparatus obtained by combining these embodiments. The equipment 9191 including the semiconductor apparatus 930 will be described in detail. The semiconductor apparatus 930 can include a semiconductor device 910 having a semiconductor layer, and a package 920 which houses the semiconductor device 910. The package 920 can include a substrate to which the semiconductor device 910 is fixed, and a lid made of glass or the like which faces the semiconductor device 910. The package 920 can further include a joining member such as a bonding wire or a bump which connects a terminal provided on the substrate and a terminal provided on the semiconductor device 910.

The equipment 9191 can include at least any of an optical device 940, a control device or circuit 950, a processing device or circuit 960, a display device 970, a storage device 980, and a mechanical device 990. The optical device 940 is compliant with the semiconductor apparatus 930. The optical device 940 is, e.g., a lens, a shutter, or a mirror. The control device 950 controls the semiconductor apparatus 930. The control device 950 is a semiconductor apparatus such as, e.g., an Applications Specific Integrated Circuit (ASIC).

The processing device 960 processes a signal output from the semiconductor apparatus 930. The processing device 960 is a semiconductor apparatus such as a Central Processing Unit (CPU) or an ASIC for constituting an AFE (analog front end) or a DFE (digital front end). The processing device 960 may be a programmable processor that can execute a program to perform operations described above. The display device 970 is an electro luminescent (EL) display device or a liquid crystal display device which displays information (image) obtained by the semiconductor apparatus 930. The storage device 980 is a magnetic device or a semiconductor device which stores information (image) obtained by the semiconductor apparatus 930. The storage device 980 is a volatile memory such as a Static Random Access Memory (SRAMO or a Dynamic Random Access Memory (DRAM), or a non-volatile memory such as a flash memory or a hard disk drive. The storage device 980 may store instructions or programs that are executed by the processing device 960 to perform operations as described above.

The mechanical device 990 has a moving unit or a propulsive unit such as a motor or an engine. In the equipment 9191, a signal output from the semiconductor apparatus 930 is displayed in the display device 970, and is transmitted to the outside by a communication device (not shown) provided in the equipment 9191. In order to do so, it is preferable that the equipment 9191 further includes the storage device 980 and the processing device 960 in addition to a storage circuit and an operation circuit of the semiconductor apparatus 930. The mechanical device 990 may also be controlled on the basis of a signal output from the semiconductor apparatus 930.

In addition, the equipment 9191 is suitably used as electronic equipment such as an information terminal having photographing function (e.g., a smartphone or a wearable terminal) or a camera (e.g., an interchangeable-lens camera, a compact camera, a video camera, or a surveillance camera). The mechanical device 990 in the camera can drive components of the optical device 940 for zooming, focusing, and shutter operation. Alternatively, the mechanical device 990 in the camera can move the semiconductor apparatus 930 for vibration isolation operation.

The equipment 9191 can be transport equipment such as a vehicle, a ship, or a flight vehicle. The mechanical device 990 in the transport equipment can be used as a moving device. The equipment 9191 serving as the transport equipment is suitably used as equipment which transports the semiconductor apparatus 930, or performs assistance and/or automation of driving (manipulation) with photographing function. The processing device 960 for assistance and/or automation of driving (manipulation) can perform processing for operating the mechanical device 990 serving as the moving device based on information obtained in the semiconductor apparatus 930. Alternatively, the equipment 9191 may also be medical equipment such as an endoscope, measurement equipment such as a distance measurement sensor, analysis equipment such as an electron microscope, office equipment such as a copier, or industrial equipment such as a robot.

According to the sixth embodiment as described above, it becomes possible to obtain excellent pixel characteristics. Consequently, it is possible to enhance the value of the semiconductor apparatus 930. At least any of addition of function, an improvement in performance, an improvement in characteristics, an improvement in reliability, an improvement in product yield, a reduction in environmental load, a reduction in cost, a reduction in size, and a reduction in weight corresponds to the enhancement of the value thereof mentioned herein.

Consequently, if the semiconductor apparatus 930 according to the sixth embodiment is used in the equipment 9191, it is possible to improve the value of the equipment as well. For example, when the semiconductor apparatus 930 is mounted on transport equipment and photographing of the outside of the transport equipment or measurement of an external environment is performed, it is possible to obtain excellent performance. Therefore, when the transport equipment is manufactured and sold, it is advantageous to determine that the semiconductor apparatus 930 according to the sixth embodiment is mounted on the transport equipment in terms of increasing the performance of the transport equipment itself. The semiconductor apparatus 930 is suitably used particularly as the transport equipment which performs driving assistance and/or automated driving of the transport equipment by using information obtained by the semiconductor apparatus 930.

Respective embodiments described up to this point, can be appropriately changed within the scope not departing from the technical idea. Incidentally, the contents disclosed in the present specification includes not only the description in the present specification but also all the matters comprehensible from the present specification and the drawings appended in the present specification.

With the technique according to the present disclosure, when recognition processing is performed using event data, recognition processing can be accurately performed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-082541, filed on May 18, 2023, which is hereby incorporated by reference herein in its entirety.

What is claimed is:

1. An image recognition apparatus comprising:

an event data obtaining member configured to obtain event data that indicates changes in light amounts of pixels of a sensor;

a metadata obtaining member configured to obtain metadata related to a position of a target object; and a processing member configured to perform, using the event data, processing for recognizing the target object using an algorithm that is based on a spiking neural network, wherein the processing member controls a period for referring to the event data in the recognition processing, based on the obtained metadata.

2. The image recognition apparatus according to claim 1, wherein the processing member changes a time constant of the spiking neural network that processes the event data, in accordance with the obtained metadata.

3. The image recognition apparatus according to claim 1, wherein each of the pixels includes a unit composed of one microlens and a plurality of image capture elements, the image recognition apparatus further includes an estimation member configured to estimate a distance to the target object based on differences in information regarding the target object that are obtained from the plurality of image capture elements, and the metadata obtaining member obtains a result of the estimation member estimating the distance to the target object, as the metadata.

4. The image recognition apparatus according to claim 1, wherein the metadata includes data including frequencies at which changes in the light amounts of the pixels occur.

5. The image recognition apparatus according to claim 1, wherein the metadata includes data related to priorities of at least a recognition accuracy and a recognition speed of the target object.

6. An equipment that includes the image recognition apparatus according to claim 1, further comprising at least one of:

an optical device that supports the image recognition apparatus;

a control device that controls the image recognition apparatus;

a processing device that processes a signal output from the image recognition apparatus;

a display device that displays information obtained by the image recognition apparatus;

a storage device that stores information obtained by the image recognition apparatus; and a mechanical device that operates based on information obtained by the image recognition apparatus.

* * * * *